United States Patent
Duerr et al.

(10) Patent No.: US 12,036,863 B2
(45) Date of Patent: Jul. 16, 2024

(54) COMBINATION INSTRUMENT FOR DISPLAYING MOTOR VEHICLE PARAMETERS AS WELL AS METHOD FOR MONITORING A DRS OF A MOTOR VEHICLE

(71) Applicant: Dr. Ing. h.c. F. Porsche Aktiengesellschaft, Stuttgart (DE)

(72) Inventors: Florian Duerr, Stuttgart (DE); Chris Paulus, Calw-Stammheim (DE)

(73) Assignee: Dr. Ing h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 18/215,357

(22) Filed: Jun. 28, 2023

(65) Prior Publication Data

US 2024/0025252 A1    Jan. 25, 2024

(30) Foreign Application Priority Data

Jul. 21, 2022 (DE) ...................... 10 2022 118 288.6

(51) Int. Cl.
*B60K 35/00* (2024.01)
*B60K 35/22* (2024.01)
*B60K 35/28* (2024.01)
*B60K 35/29* (2024.01)

(52) U.S. Cl.
CPC .............. *B60K 35/00* (2013.01); *B60K 35/29* (2024.01); *B60K 35/22* (2024.01); *B60K 35/28* (2024.01); *B60K 2360/167* (2024.01); *B60K 2360/188* (2024.01)

(58) Field of Classification Search
CPC ........ B60K 35/22; B60K 35/28; B60K 35/29; B60K 35/00; B60K 2360/167; B60K 2360/188
See application file for complete search history.

(56) References Cited

U.S. PATENT DOCUMENTS

| | | | |
|---|---|---|---|
| 9,530,259 B2 * | 12/2016 | Hauschild | .............. B60K 35/10 |
| 10,124,840 B2 | 11/2018 | Gandhi et al. | |
| 11,548,498 B2 | 1/2023 | Titus et al. | |
| 2017/0088194 A1 * | 3/2017 | Heil | ........................ B62D 35/00 |
| 2017/0217508 A1 * | 8/2017 | Paulus | .................. B62D 35/007 |

FOREIGN PATENT DOCUMENTS

| | | |
|---|---|---|
| DE | 202009002106 U1 | 5/2009 |
| DE | 102018000494 A1 | 7/2018 |

\* cited by examiner

*Primary Examiner* — Evan P Dzierzynski
*Assistant Examiner* — Nathaniel J Lee
(74) *Attorney, Agent, or Firm* — Gerald E. Hespos; Michael J Porco

(57) ABSTRACT

A combination instrument (10) of a motor vehicle has a data input (16) for feeding measurement data related to vehicle parameters, including a status (22) of a drag reduction system (DRS). A display (12) is connected to the data input (16) via a computer unit (14) for graphically representing the measurement data. The display (12) is configured to represent an image (18) of the motor vehicle composed of multiple graphical sub-objects (20). The computer unit (14) is configured to have the display (12) represent sub-objects (20) relevant to the operation of the DRS in a neutral color, a standby color or a warning color depending on the status (22) of the DRS and other measurement data.

9 Claims, 1 Drawing Sheet

COMBINATION INSTRUMENT FOR DISPLAYING MOTOR VEHICLE PARAMETERS AS WELL AS METHOD FOR MONITORING A DRS OF A MOTOR VEHICLE

CROSS REFERENCE TO RELATED APPLICATION

This application claims priority on German Patent Application No 10 2022 118 288.6 filed Jul. 21, 2022, the entire disclosure of which is incorporated herein by reference.

BACKGROUND

Field of the Invention. The invention relates to a combination instrument for displaying motor vehicle parameters as well as a method for monitoring a drag reduction system (DRS) of a motor vehicle, with the help of which a driver of the motor vehicle is assisted in using the DRS.

Related Art. U.S. Pat. No. 9,530,259 B2 discloses a combination instrument that enables a driver to see measurement data of an automobile vehicle. The automobile is depicted graphically in gray, while defective parts of the automobile are depicted in red.

DE 10 2018 000 494 A1 discloses an automatically adjustable air-guiding element of a motor vehicle for an air resistance that is a function of a position of a motor vehicle on a circular course.

There is a constant need to drive a motor vehicle in a high-performance and safe manner.

SUMMARY OF THE INVENTION

One aspect of the invention relates to a combination instrument for displaying motor vehicle parameters to a driver of a motor vehicle. The motor vehicle has a data input for feeding measurement data related to vehicle parameters including a status of a drag reduction system (DRS). The combination instrument also has a display connected to the data input via a computer unit for graphically representing the measurement data. The display is configured to represent an image of the motor vehicle composed of multiple graphical sub-objects. The computer unit is configured to have the display represent sub-objects relevant to the operation of the DRS in a neutral color, a standby color or an active color. The neutral color is displayed when the status of the DRS is set to deactivated. The standby color is different from the neutral color and is displayed when the status of the DRS is set to ready and/or activated and the computer unit calculates an activation of the DRS as allowed based on the measurement data. The warning color is different from the neutral or standby colors and is displayed when the status of the DRS is set to ready and the computer unit calculates an activation of the DRS as not allowed based on the measurement data.

The DRS is understood to mean a motor vehicle system that is capable of reducing the air resistance of the motor vehicle. For this purpose, the DRS can, for example, displace air-guiding elements, for example wings, spoilers, or diffusers, and/or change their angle of actuation. The reduced air resistance favors higher speeds and thereby allows a more high-performance driving of the motor vehicle. In addition, the reduced air resistance can reduce the energy expenditure and thus the fuel or energy consumption. However, due to the reduced air resistance, a contact pressure of the motor vehicle on a substrate can decrease. Thus, a buoyancy of the motor vehicle increases. Increased buoyancy reduces a wheel load and a cornering limit speed, which is usually undesirable for the driver and can impair driving safety.

An automated operation of the DRS usually is possible only in very restricted situations, so that the DRS does not create a surprising dangerous driving situation for the driver without a sufficient possibility of intervention by the driver. Thus, it is desirable that, in driving situations that will require a higher contact pressure in the near future, the DRS is turned off and again a higher air resistance leading to a higher contact pressure is provided intentionally. However, such a driving situation can hardly or only insufficiently be identified by automatically operating sensors. Thus, for safety reasons, the automatically operated DRS would also be switched off in driving situations in which this would even be necessary. This makes automated operation of the DRS very inefficient. Instead, it is more efficient and results in a generally more high-performance driving experience over a longer distance and/or period of time when the driver turns the DRS on and off. For example, the driver himself knows best in time when and where he intends to drive in a curve and needs an increased contact pressure with the DRS switched off.

It has been discovered that driving safety in an activated DRS also can depend on measurement data that can be acquired using measurement technology, and these data can enable the driver to better assess the switching on and switching off of the DRS. Thus, a particularly intuitive human-machine interface is desirable for this purpose and should be able to process the relevant measured values into a simplified form.

The sub-objects described herein can be colored with an intuitive color coding that will be perceived visually as a 3D model. Thus, the display can appropriately characterize the components relevant for the operation of the DRS to provide a particularly intuitively detectable human-machine interface. The driver can indicate a readiness to activate the DRS via a corresponding setting on the vehicle. If the readiness to activate the DRS has been indicated by the driver, automotive components assess measurement data of the vehicle to determine whether a driver activation of the DRS should be allowed. The standby color, such as a green shade, will be displayed within the image of the motor vehicle shown by the display if the automotive components determine that a driver activation of the DRS should be allowed. On the other hand, the warning color, for example a red shade, will be displayed within the image of the motor vehicle shown by the display if the automotive components determine that a driver activation of the DRS should not be allowed. The driver thereby receives status feedback notifications based on measurements, and the feedback notifications are displayed visually in a manner that can be comprehended to favor an easy decision-making process as to whether the DRS can be activated safely. For example, only tires shown on one side of the vehicle in the warning color could indicate a substrate that is unfavorable for activating the DRS, wherein the substrate on the other side of the vehicle appears suitable for this purpose so that the driver or the operator can better position the motor vehicle in the lateral direction on the roadway before the DRS is activated. This enables a high-performance and safe driving of a motor vehicle.

The data input can be configured as a data interface that allows a connection to a CAN bus, for example to be able to read the measurement data relevant to the DRS as well as the status of the DRS. The data input can be wired but can also be configured wirelessly. In addition, the data input can be connected directly or indirectly to the measuring devices, in particular via the CAN bus.

The computer unit can process, evaluate, and calculate the measurement data fed in via the data input and the status of the DRS as to whether there is an operating situation in the vehicle components relevant for the operation of the DRS that allows or does not allow operation of the DRS, particularly for reasons of driving safety. For this purpose, for example, the measurement data can be compared to threshold values for admissibly. In addition, the computer unit can generate control data to map the particular sub-objects of the image of the motor vehicle shown by the display associated with the motor vehicle components in the corresponding color coding: neutral color, standby color, and warning color.

The display is an optical display, in particular with LCDs, LEDs, and OLEDs, that are capable of optically signaling variable information. The display can be part of an instrument panel provided in the vicinity of a steering wheel.

The measured values may relate to the respective motor vehicle components, such as air-guiding elements, tires, engaging forces, pressures, positions, angular positions, temperatures. The readings can also include general vehicle data such as vehicle speed, slippage on the tire, transverse forces, yaw angle, pitch angle, roll angle, engine power, engine speed, engine torque, transmission position, outside temperature, and contact pressure.

The display of some embodiments is configured to represent the status of the DRS, and the representation of the status of the DRS can be in the neutral color, standby color, and/or warning color, as described above. The status also can be displayed flashing, in particular as a function of the content value of the status. The status of the DRS can be represented by the display as a typed out word with alphanumeric characters, for example, or as a symbol or pictogram. Thus, the driver can be notified immediately whether the DRS is already activated or not and what has to be done to bring about a desired status of the DRS.

The status of the DRS in some embodiments includes: deactivated, ready, triggered, activated, and error states. In the "deactivated" state, activation of the DRS is not desired. Thus, it is not necessary to display sub-objects in the motor vehicle shown in the standby color or the warning color that are relevant to the DRS. Accordingly, an unnecessarily high number of signals to be represented can be avoided. In the "activated" state, the reduction of the air resistance by the DRS is achieved fully or partially. The "triggered" state may indicate which activations of the DRS already have been triggered, but have not yet reached the end state achievable by the DRS. In this case, the "activated" state documents the end state achieved by the DRS. In the "ready" state, by contrast to the "deactivated" state, the desire to potentially activate the DRS is signaled. This makes it clear that a representation of sub-objects in the standby color or the warning color is intended to support the activation of the DRS. The "error" state may be displayed if plausibility checks of the measured values within the computer unit detect inconsistencies exist that make the information signaled by the display uncertain and/or ambiguous. An activation of the DRS can be prevented in this case.

In some embodiments, the status of the DRS can be manipulated by a switching element that is actuatable by the driver. The switching element can be installed in a steering wheel of the motor vehicle so that only the driver can trigger the DRS. An automatic or accidental triggering of the DRS can thereby be avoided. If necessary, in particular for reasons of driving safety, an automatic deactivation of the DRS can be allowed.

The computer unit of some embodiments is configured to receive measurement data indicative of tire air pressure, such as a contact pressure of one or more tires on a substrate. The display of some embodiments may display at least one sub-object relating to the respective tire. The representation of the tire air pressure can be in neutral color, standby color, and/or warning color. The tire air pressure can be presented as a numeric value in the display and can provide additional information that can be relevant to the triggering, duration, and/or extent of the air resistance reduction of the DRS.

The computer unit of some embodiments is configured to receive measurement data that represents a position and/or an air resistance of at least one air-guiding element that is adjustable by the DRS with the aid of the sub-object relating to the respective air-guiding element. The computer unit may cause the display to provide a representation of the sub-object relating to the air-guiding element and/or to provide a representation of the air resistance associated with the air-guiding element to be shown in the neutral color, standby color, and/or warning color. The representation can be made by a graphical adjustment of the respectively assigned sub-object in the image shown by the display and/or by an indication of an assigned numerical value. The display thereby provides additional information that can be relevant for the triggering, duration, and/or extent of the air resistance reduction of the DRS.

The computer unit and the display of some embodiments are configured to represent a color gradient that can change over time between the neutral color and the standby color and/or between the standby color and the warning color based on the measurement data. These color gradients can make it clear how much a measured value for a particular motor vehicle component deviates from a threshold value and/or how quickly a change in the status of the DRS is made. The display thereby provides additional information that can be relevant for the triggering, duration, and/or extent of the air resistance reduction of the DRS.

A further aspect of the invention relates to a method for monitoring a DRS of a motor vehicle, such as with the aid of a combination instrument that can be designed and developed as described above. The method of some embodiments includes representing an image of the motor vehicle composed of multiple graphical sub-objects. The method proceeds by measuring measurement data relevant to the operation of the DRS and determining a status of the DRS. The method of some embodiments continues by representing the sub-objects relevant to the operation of the DRS in a neutral color, a standby color or a warning color. The method may be carried out by representing the sub-objects in the display with the neutral color when the status of the DRS is set to deactivated. The method may be carried out by representing the sub-objects in the display with the neutral color or a standby color that is different than the neutral color when the status of the DRS is set to ready and/or activated and the measurement data allow an activation of the DRS. The method may be carried out by representing the sub-objects in the display with a warning color that is different from the neutral or standby color when the status of the DRS is set to ready and the measurement data does not allow an activation of the DRS. The method can be designed and further developed as explained above with the aid of the combination instrument. The intuitive, variable color coding of the sub-objects enables a high-performance and safe driving of a motor vehicle.

The method may include allowing activation of the DRS when a tire air pressure of tires of the vehicle lies above a specified threshold value, and an activation of the DRS is not allowed when a tire air pressure of at least one tire of the vehicle lies below the specified threshold value. The tire air pressure corresponds to a contact pressure of the tire on a substrate. This enables an allowance condition that is particularly relevant for the driving safety when activating the DRS to be measured easily and quickly.

The invention is explained by way of example below with reference to the accompanying drawings on the basis of illustrated embodiments. The features presented below can represent an aspect of the invention both individually and in combination.

DETAILED DESCRIPTION

Figure 1:
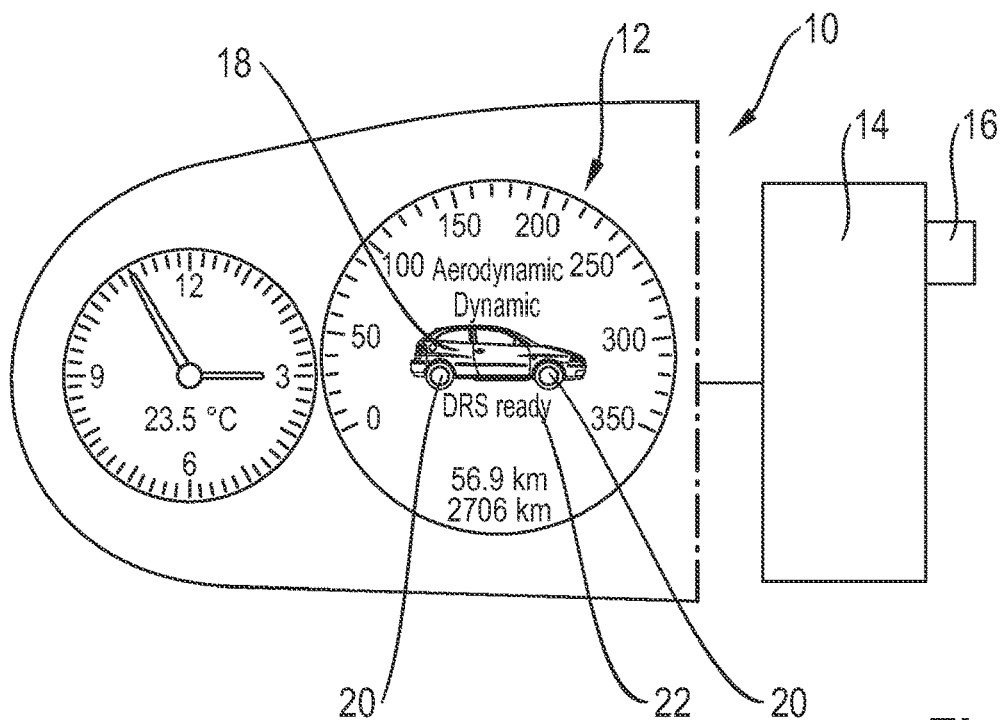
FIG. 1 is a schematic diagram of a first embodiment of the invention.

The combination instrument 10 is shown simplified in FIG. 1 and can be provided in an instrument panel of a motor vehicle, such as a sports car or a race car. The combination instrument 10 comprises a display 12 that is controlled by a computer unit 14, in which measurement data can be fed via a data input 16. The display 12 shows an image 18 of the motor vehicle that is composed of multiple, separately colorable sub-objects 20. For reasons of simplified depiction, only the sub-objects 20 associated with the wheels are shown here. However, other air-guiding elements, for example a rear wing, can be a separately colorable sub-object 20. For example, below the image 18 is shown a state of a status 22 of a DRS that is "ready" in the depicted embodiment is shown, for example, in a neutral color or in a standby color.

Figure 2:
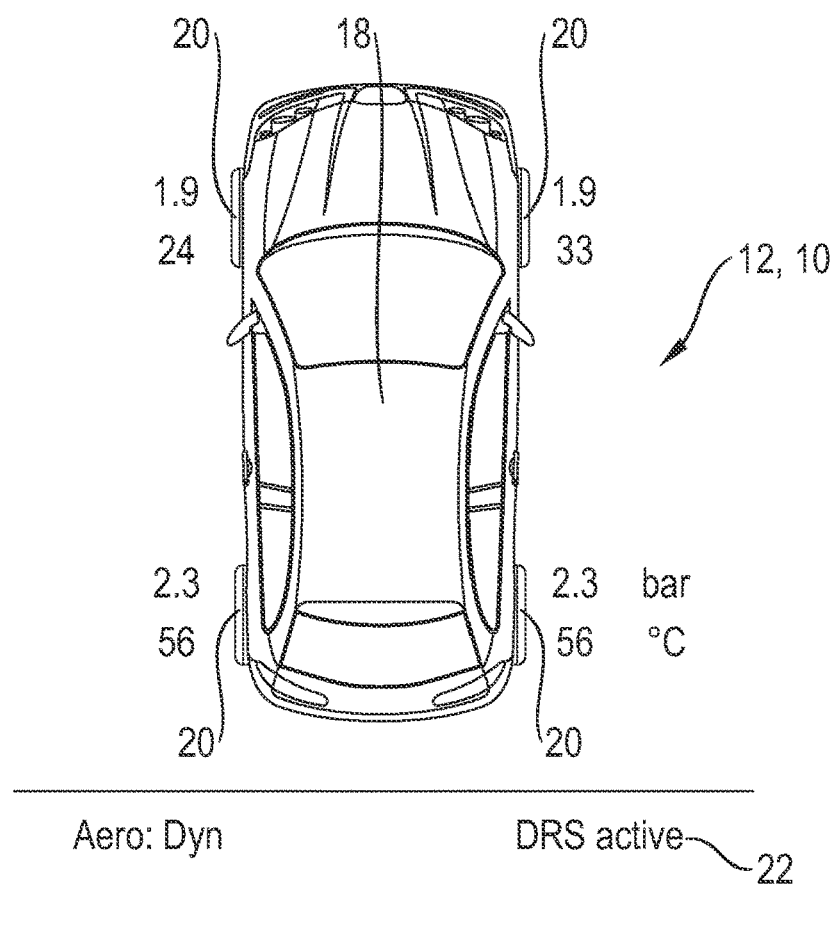
FIG. 2 is a schematic plan view of a second embodiment of the invention.

The image 18 of FIG. 1 shows a side view of the motor vehicle. FIG. 2 shows that it is also possible to represent the image 18 as a top view of the motor vehicle. This allows for a representation of all sub-objects 20 that are associated with a wheel. In addition, each of these sub-objects 20 is associated with additional information about the tire pressure and the tire temperature to provide a good overview of the safety-relevant information for activating a DRS. In the embodiment example shown in FIG. 2, the state of the status 22 is "active" and is preferably shown in the standby color.

The tire pressure and the tire temperature can be measured via suitable known measuring means as measurement data that are fed into the computer unit 14 via the data input 16. For example, the computer unit 14 can compare the measurement data to threshold values. If the measured values are within an allowed range, the computer unit 14 can have the display 12 color the sub-object associated with these measured values in a standby color. If the measured values are not within an allowed range, the computer unit 14 can have the display 12 color the sub-object associated with these measured values in a warning color. The threshold values are oriented towards a specification profile for the activation of the DRS, which is based on the reduced air resistance and reduced contact pressure following activation of the DRS. When operating the motor vehicle without intentional activation of the DRS, very different amounts can be relevant to the threshold values to anticipate a dangerous driving situation using the computer unit.

The invention claimed is:

1. A combination instrument (10) for a motor vehicle having a drag reduction system (DRS), comprising:
    a data input (16) connected to components of the vehicle for collecting measurement data related to vehicle parameters including parameters indicative of a status (22) of the DRS;
    a computer unit (14) connected to the data input (16) for receiving and analyzing the measurement data;
    a display (12) connected to the computer unit (14) for graphically representing an image of the motor vehicle, including sub-objects (20) of the motor vehicle that relate to the DRS and at least certain of the measurement data, wherein:
    the computer unit (14) is configured to have the display (12) represent the sub-objects (20) relevant to the operation of the DRS in a neutral color, a standby color or a warning color that are different from one another, with the neutral color, the standby color or the warning color being selected based at partly on the measurement data.

2. The combination instrument (10) of claim 1, wherein the computer unit (14) is configured to cause the display (12) to display the sub-objects (20) in:
    the neutral color when the status (22) of the DRS is set to deactivated;
    the neutral color or the standby color when the status (22) of the DRS is set to ready and/or activated and when the computer unit (14) calculates an activation of the DRS as being allowed based on the measurement data; and
    the warning color when the status (22) of the DRS is set to ready and the computer unit (14) calculates an activation of the DRS as not allowed based on the measurement data.

3. The combination instrument (10) of claim 2, wherein the status (22) of the DRS comprises the states deactivated, ready, triggered, activated, and error.

4. The combination instrument (10) of claim 2, wherein the status (22) of the DRS can be manipulated by a driver-actuatable switching element.

5. The combination instrument (10) of claim 2, wherein the computer unit (14) and the display (12) are configured, on the basis of the measurement data, to represent air pressure of at least one tire and at least one sub-object (20) relating to the at least one tire, wherein the representation of the air pressure of the at least one tire being shown in the neutral color, the standby color or the warning color.

6. The combination instrument of claim 1, wherein the computer unit (14) and the display (12) are configured to display, based on the measurement data, a position and/or an air resistance of at least one air-guiding element that is adjustable by the DRS with the aid of the sub-object relating to the respective air-guiding element, wherein the representation of the sub-object relating to the air-guiding element and/or the representation of the air resistance shown in addition to the air-guiding element being shown in the neutral color, standby color, and/or warning color.

7. The combination instrument of claim 1, wherein the computer unit (14) and the display (12) are configured to represent a color gradient that can change over time between the neutral color and the standby color and/or between the standby color and the warning color, based on the measurement data.

8. A method for monitoring a drag reduction system (DRS) of a motor vehicle, comprising:
    representing an image (18) of the motor vehicle composed of multiple graphical sub-objects (20);

measuring measurement data relevant to the operation of the DRS;

determining a status (22) of the DRS; and representing the sub-objects (20) relevant to the operation of the DRS in a neutral color when the status (22) of the DRS is set to deactivated, in the neutral color or a standby color that is different than the neutral color when the status (22) of the DRS is set to ready and/or activated and the measurement data allow an activation of the DRS, and in a warning color that is different from the neutral or standby color when the status (22) of the DRS is set to ready and the measurement data does not allow an activation of the DRS.

9. The method of claim 8, wherein activation of the DRS is allowed when a tire air pressure of tires of the vehicle lies above a specified threshold value, and an activation of the DRS is not allowed when a tire air pressure of at least one tire of the vehicle lies below the specified threshold value, wherein the tire air pressure corresponds to a contact pressure of the tire on a substrate.

* * * * *